United States Patent
Takizawa et al.

(10) Patent No.: US 10,497,146 B2
(45) Date of Patent: Dec. 3, 2019

(54) VISUAL SENSOR ABNORMALITY CAUSE ESTIMATION SYSTEM

(71) Applicant: FANUC CORPORATION, Yamanashi (JP)

(72) Inventors: Shouta Takizawa, Yamanashi (JP); Fumikazu Warashina, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/862,875

(22) Filed: Jan. 5, 2018

(65) Prior Publication Data
US 2018/0197311 A1  Jul. 12, 2018

(30) Foreign Application Priority Data
Jan. 12, 2017 (JP) ................. 2017-003343

(51) Int. Cl.
*G06T 7/80* (2017.01)
*B23P 19/00* (2006.01)
(Continued)

(52) U.S. Cl.
CPC ............ *G06T 7/85* (2017.01); *B23P 19/007* (2013.01); *B25J 9/10* (2013.01); *B25J 9/1602* (2013.01); *B25J 9/1671* (2013.01); *B25J 9/1697* (2013.01); *G06T 7/80* (2017.01); *G05B 2219/39008* (2013.01); *G05B 2219/39045* (2013.01)

(58) Field of Classification Search
CPC .................... G06T 7/80; G06T 7/85
See application file for complete search history.

(56) References Cited

U.S. PATENT DOCUMENTS

| | | | | |
|---|---|---|---|---|
| 2005/0071048 | A1* | 3/2005 | Watanabe | B25J 9/1664 700/259 |
| 2013/0027561 | A1* | 1/2013 | Lee | G06Q 30/02 348/150 |
| 2018/0137377 | A1* | 5/2018 | Nishida | G08G 1/0112 |

FOREIGN PATENT DOCUMENTS

| | | |
|---|---|---|
| CN | 103308661 | 9/2013 |
| JP | 2003-131307 | 5/2003 |

(Continued)

*Primary Examiner* — Mohamed Charioui
*Assistant Examiner* — Christine Y Liao
(74) *Attorney, Agent, or Firm* — Wenderoth, Lind & Ponack, L.L.P.

(57) ABSTRACT

A camera abnormality cause estimation system for estimating the causes of abnormalities in a camera in a production system in which the camera controls a robot. The production system includes a robot, a camera that detects visual information of the robot or the surrounding thereof, and a controller that controls the robot based on an image signal obtained by the camera. The camera abnormality cause estimation system estimates the causes of abnormalities in the camera and includes an environment information acquisition unit that acquires environment information of the camera, and an abnormality cause estimation unit that estimates a probability that each of a plurality of predetermined abnormality cause items is the cause of an abnormality in the camera for the respective abnormality cause items using the environment information acquired by the environment information acquisition means and displays the estimated probability on a display unit for the respective abnormality cause items.

7 Claims, 4 Drawing Sheets

(51) Int. Cl.
*B25J 9/10* (2006.01)
*B25J 9/16* (2006.01)

(56) References Cited

FOREIGN PATENT DOCUMENTS

| | | |
|---|---|---|
| JP | 2004-363781 | 12/2004 |
| JP | 2006-013120 | 1/2006 |
| JP | 2006-352644 | 12/2006 |
| JP | 2012-169394 | 9/2012 |
| JP | 2013-46350 | 3/2013 |
| JP | 2013-115726 | 6/2013 |
| JP | 2016-141522 | 8/2016 |
| JP | 2018-051721 | 4/2018 |
| WO | 2012/111202 | 8/2012 |
| WO | 2014/076755 | 5/2014 |

\* cited by examiner

VISUAL SENSOR ABNORMALITY CAUSE ESTIMATION SYSTEM

This application is based on and claims the benefit of priority from Japanese Patent Application No. 2017-003343, filed on 12 Jan. 2017, the content of which is incorporated herein by reference.

BACKGROUND OF THE INVENTION

Field of the Invention

The present invention relates to a visual sensor abnormality cause estimation system. More specifically, the present invention relates to a visual sensor abnormality cause estimation system for estimating the cause of abnormalities in visual sensors installed in a production system.

Related Art

Visual sensors are installed in various production devices such as a robot that conveys and processes a target object or an inspection device that determines the quality of a target object in order to obtain visual information of the target object. For example, a conveying robot that conveys a target object from, a predetermined position to a predetermined position detects the position, the attitude, and the like of the target object by performing image processing such as template matching on visual information obtained by visual sensors, grasps the target object at an appropriate position, and conveys the target object to a predetermined position. In a production system in which visual sensors are installed in this manner, when a desired image is not obtained by a visual sensor due to certain abnormalities in the visual sensor, a production device controlled using visual information obtained by the visual sensor may be unable to perform its function appropriately.

For example, Patent Document 1 discloses a device that detects abnormalities in a visual sensor. More specifically, Patent Document 1 discloses a device that determines whether a visual sensor operates in synchronization with an external synchronization signal to detect abnormalities in the visual sensor in a system which outputs an external synchronization signal to the visual sensor and processes image data output from the visual sensor in synchronization with the external synchronization signal. According to the device disclosed in Patent Document 1, it is possible to specify whether the cause of abnormalities in the visual sensor is attributable to disconnection of a signal line that delivers an external synchronization signal to the visual sensor or the visual sensor itself breaks down and is unable to operate in synchronization with the external synchronization signal.

For example, Patent Document 2 discloses a device that detects an abnormal image from images obtained by a visual sensor. More specifically, Patent Document 2 discloses a device that detects an abnormal image obtained by a visual sensor by comparing an image statistical value calculated using images captured by the present visual sensor with an image statistical value calculated using images captured when the visual sensor operates normally.

Patent Document 1: Japanese Unexamined Patent Application, Publication No. 2013-46350
Patent Document 2: Japanese Unexamined Patent Application, Publication No. 2006-352644

SUMMARY OF THE INVENTION

However, when an abnormality occurs actually in a visual sensor installed in a production system, an operator needs to specify a specific cause of the abnormality in the sensor in order to allow the production device to return to an appropriate state. However, there are a wide range of causes of abnormalities in the visual sensor. More specifically, examples of the causes include (A) a case in which the visual sensor itself breaks down and is unable to perform its function, (B) a case in which a trouble occurs in a cable that connects the visual sensor to other devices, and (C) a case in which the cause results from a change in ambient environment of the visual sensor. When the cause of abnormalities in the visual sensor is (A) or (B), an operator can specify the cause of the abnormality using such a device as disclosed in Patent Document 1, for example.

However, when the cause of abnormalities in the visual sensor is (C), that is, when the cause results from, a change in ambient environment of the visual sensor, it is difficult to specify a specific cause of abnormalities clue to the following reasons. For example, since an abnormality in the visual sensor resulting from such a case may occur even when the visual sensor has not broken down, it is difficult to specify the cause by monitoring the state of the visual sensor. Moreover, since an abnormality in the visual sensor resulting from such a case may occur under a specific condition, it is difficult to reproduce an environment which caused an abnormality. Moreover, there is a case in which an abnormality occurs in a visual sensor after the elapse of a short period after a specific event which caused an abnormality in the visual sensor occurs. In this case, it is difficult to specify a causal dependency between a specific event and an abnormality in the visual sensor. Due to this, conventionally, when an abnormality occurs in a visual sensor, an operator has to check a presumed cause by a round robin method and it may take a considerable amount of time for the production device to return to a normal state.

An object of the present invention is to provide a visual sensor abnormality cause estimation system for estimating the cause of abnormalities in a visual sensor in a production system in which the visual sensor is installed to control a production device.

(1) A production system (for example, a production system S to be described later) includes a production device (for example, a robot 5 to be described later), a visual sensor (for example, a camera 6 to be described later) that detects visual information on the production device or a surrounding thereof, and a controller (for example, a controller 7 to be described later) that controls the production device on the basis of the visual information obtained by the visual sensor. A visual sensor abnormality cause estimation system (for example, an abnormality cause estimation system 1 or 1A to be described later) of the present invention estimates the causes of abnormalities in the visual sensor and includes: an environment information acquisition means (for example, an environment information acquisition means 2 to be described later) that acquires environment information of the visual sensor; and an abnormality cause estimation means (for example, an arithmetic unit 32 or 32A or an abnormality cause estimation unit 37 or 37A to be described later) that estimates a strength of correlation between an abnormality in the visual sensor and each of a plurality of predetermined abnormality cause items using the environment information acquired by the environment information acquisition means and displays the estimated strength of correlation on a display means (for example, a display unit 33 to be described later) for the respective abnormality cause items.

The expression "abnormality in the visual sensor" in the present invention is defined as the inability of the visual sensor to obtain desirable visual information. Moreover, the expression "desirable visual information" in the present invention is defined as information with which the production device can realize an appropriate function (a conveying operation of grasping a target object at an appropriate position and an appropriate attitude and conveying the target object to an appropriate position, a function of determining the quality of the target object accurately) when the production device is controlled on the basis of this information. Therefore, in the present invention, it is possible to cope with abnormalities in the visual sensor even when desirable visual information is not obtained due to a failure in the visual sensor itself and a trouble in a cable connecting the visual sensor and other devices and when desirable visual information is not obtained due to strong light entering the lens of the visual sensor or vibration of the visual sensor.

(2) In the visual sensor abnormality cause estimation system according to (1), the abnormality cause estimation means may estimate the strength of correlation using the environment information in a period between an abnormality occurrence time point of the visual sensor and a predetermined previous time point.

(3) The visual sensor abnormality cause estimation system according to (2) may further include an abnormality occurrence time point specifying means (for example, an image processing unit 71 to be described later) that specify the abnormality occurrence time point on the basis of the visual information.

(4) The visual sensor abnormality cause estimation system according to (2) may further include: an image processing means (for example, an image processing unit 71 to be described later) that performs a predetermined image processing operation on the visual information; and an abnormality occurrence time point specifying means (for example, a robot operation determination unit 36 or 36A or a camera abnormality detection unit 38A to be described later) that specifies the abnormality occurrence time point using image processing information obtained through the image processing operation and operation result information on a result of operations performed by the production device on the basis of the visual information.

(5) In the visual sensor abnormality cause estimation system according to any one of (1) to (4), the environment information acquisition means subdivides the environment of the visual sensor into a plurality of environmental items and acquires environment information belonging to each of the environmental items, and each of the abnormality cause items is the same as one of the plurality of environmental items.

(6) In the visual sensor abnormality cause estimation system according to (5), the environmental item may include vibration of a specific device installed around the visual sensor, a temperature of the specific device, and a brightness of the surrounding of the visual sensor.

(7) In the visual sensor abnormality cause estimation system according to any one of (1) to (6), the abnormality cause estimation means may estimate the strength of correlation between an abnormality in the visual sensor and each of the plurality of abnormality cause items using the environment information and information on the change over time thereof as an input.

In the production system, the visual sensor detects the visual information of the production device or the surrounding thereof and the controller controls the production device on the basis of the visual information obtained by the visual sensor. The environment information acquisition means acquires environment information of the visual sensor included in the production device, and the abnormality cause estimation means estimates the strength of the correlation between the abnormality in the visual sensor and each of the plurality of predetermined abnormality cause items using the environment information acquired by the environment information acquisition means and displays the strength of correlation on the display means for the respective abnormality cause items. In this way, when an abnormality occurs in the visual sensor during operations of the production system, for example, the operator can check the causes of the abnormality from a plurality of abnormality cause items in descending order of the strengths of correlation displayed on the display means using the abnormality cause estimation system of the present invention. Therefore, the operator can specify the cause of the abnormality in the visual sensor more quickly than the conventional method in which a presumed cause is checked by a round-robin method.

DETAILED DESCRIPTION OF THE INVENTION

First Embodiment

Figure 1:
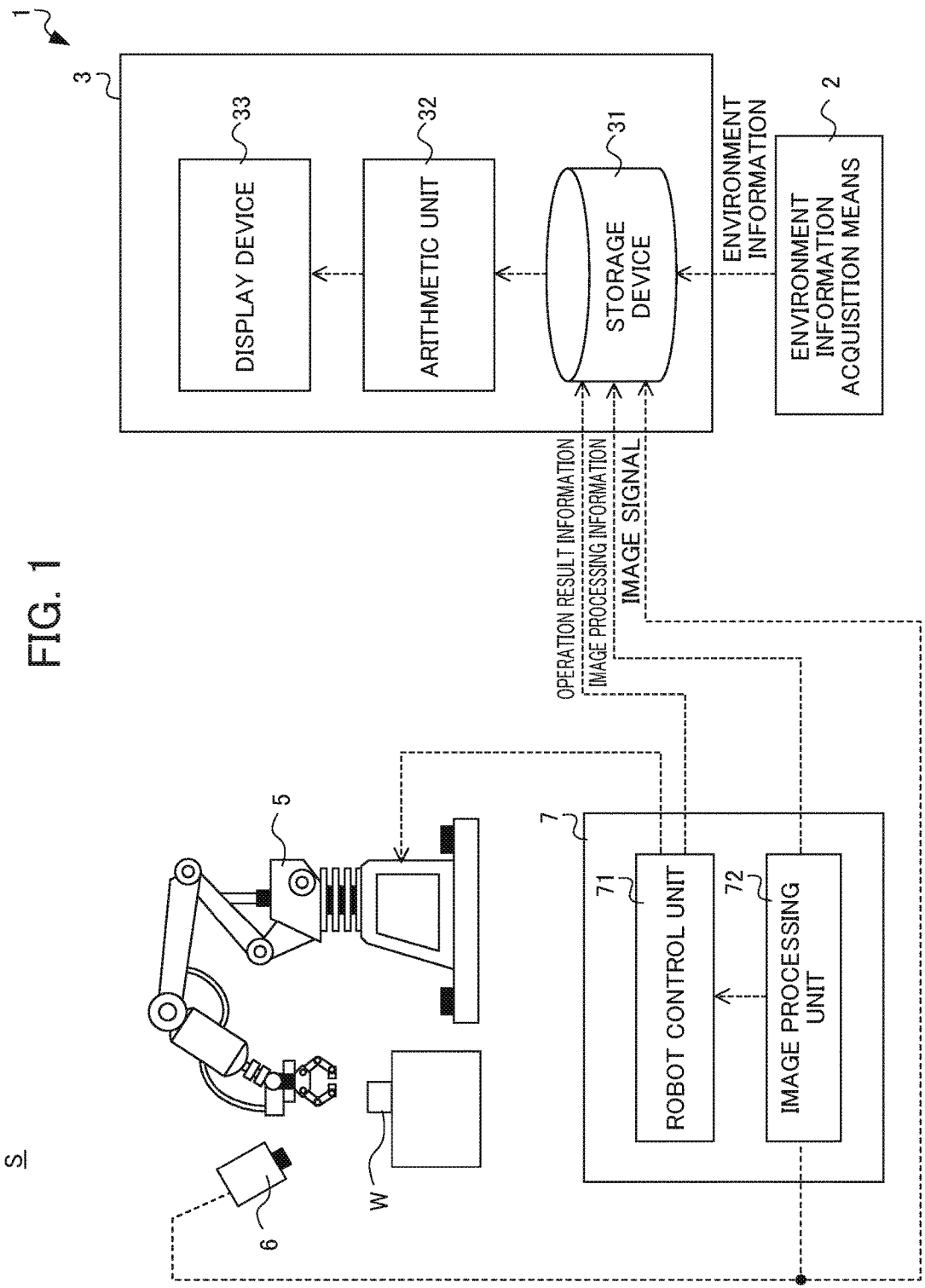
FIG. 1 is a diagram, illustrating a configuration of a production system in which a visual sensor abnormality cause estimation system according to a first embodiment of the present invention is included.

Hereinafter, a first embodiment of the present invention will be described with reference to the drawings. FIG. 1 is a diagram illustrating a configuration of a production system S in which a visual sensor abnormality cause estimation system 1 according to the present embodiment is included.

The production system S includes a robot 5 as a production device, a camera 6 as a visual sensor that detects visual information of the robot 5 or the surrounding thereof, a controller 7 that controls the robot 5 on the basis of an output of the camera 6, and an abnormality cause estimation system 1 that estimates the cause of abnormalities in the camera 6.

For example, the robot 5 is a conveying robot that executes a series of conveying operations of grasping a workpiece W which is one of the parts of a product at a predetermined position according to a control signal transmitted from the controller 7 and conveying the grasped workpiece W up to a predetermined position.

The camera 6 is installed on a frame provided in the robot 5 or the surrounding thereof. The camera 6 images the robot 5 or the workpiece W according to a request from the controller 7 to obtain an image signal and transmits the image signal to the controller 7 and the abnormality cause estimation system 1 at a predetermined interval.

The controller 7 includes an image processing unit 71 and a robot control unit 72. The image processing unit 71 performs a plurality of image processing operations on the image signal transmitted from the camera 6. The image processing unit 71 transmits image processing information obtained through the plurality of image processing operations to the robot control unit 72 and the abnormality cause estimation system 1 at a predetermined interval. Here, examples of the image processing information transmitted from the image processing unit 71 include an image including the workpiece W, the contrast of an outline of the workpiece W captured in the image, the brightness of this image, the score indicating the probability of the workpiece W detected from the image, a detection position of the workpiece W detected from the image and a detection error thereof, the presence of a detection error of the workpiece W (that is, a position different from the actual position being detected as the position of the workpiece W in the image), a black level of the camera 6, and a data error rate of an image signal transmitted from the camera 6.

The robot control unit 72 generates a control signal for causing the robot 5 to execute the above-described conveying operation on the basis of the image processing information obtained through the plurality of image processing operations of the image processing unit 71 and transmits the control signal to the robot 5. Moreover, the robot control unit 72 acquires information on the result of the conveying operation executed on the basis of the image signal of the camera 6 as described above, on the basis of a signal transmitted from a force sensor or the like (not illustrated) installed in the robot 5 and transmits the information to the abnormality cause estimation system 1 as operation result information at a predetermined interval. Here, examples of the operation result information transmitted from the robot control unit 72 includes information on whether the robot 5 is able to grasp the workpiece W in a series of conveying operations and a grasping shift amount from a predetermined reference position when the robot 5 grasps the workpiece W.

The abnormality cause estimation system 1 includes an environment information acquisition means 2 that acquires information on the environment of the camera 6 and an information processing device 3 that performs operations related to estimation of abnormalities in the camera 6 using the information transmitted from the environment information acquisition means 2, the camera 6, the image processing unit 71, and the robot control unit 72 and the cause thereof.

The environment information acquisition means 2 acquires a plurality of types of environment information on the environment that may affect the functions of the camera 6 at predetermined intervals and transmits the acquired environment information to the information processing device 3. Here, the environment information acquired by the environment information acquisition means 2 is subdivided into thirteen environmental items, for example, as illustrated below. The environment information belong to respective items is as follows.

Information on vibration of the camera 6 is classified to Item 1. The environment information acquisition means 2 acquires environment information belonging to Item 1 using an output of a vibration sensor provided in the camera 6, for example. Information on temperature of the camera 6 is classified to Item 2. The environment information acquisition means 2 acquires environment, information belonging to Item 2 using an output of a temperature sensor provided in the camera 6, for example. Information on temperature of a peripheral device provided around the camera 6 is classified to Item 3. The environment information acquisition means 2 acquires environment information belonging to Item 3 using an output of a temperature sensor provided in a peripheral device, for example. Information on the brightness of the surrounding of the camera 6 is classified to Item 4. The environment information acquisition means 2 acquires environment information belonging to Item 4 using an output of an illuminance sensor provided in or near the camera 6, for example. Information on a date and a time point is classified to Item 5. The environment information acquisition means 2 acquires environment information belonging to Item 5 using a clock, for example.

Information on weather is classified to Item 6. The environment information acquisition means 2 acquires environment information belonging to Item 6 using information distributed from a weather information distribution server, for example. Information on an ON/OFF state of a ceiling light in a room where the camera 6 is installed is classified to Item 7. The environment information acquisition means 2 acquires environment information belonging to Item 7 using an output of a controller of the ceiling light, for example. Information on setting temperature of an air-conditioner in a room where the camera 6 is installed is classified to Item 8. The environment information acquisition means 2 acquires environment information belonging to Item using an output of a controller of the ceiling light, for example. Information on the type of the workpiece W which is an operation target of the robot 5 is classified to Item 9. The environment information acquisition means 2 acquires environment information belonging to item 9 using a signal transmitted from the controller 7, for example. Information on an operating state of a peripheral device provided around the camera 6 (more specifically, whether the peripheral device is in an operating state, a stopping state, or a standby state) is classified to Item 10. The environment information acquisition means 2 acquires environment information belonging to Item 10 using a signal transmitted from the peripheral device.

Information on a signal transmitted and received to synchronize operations between a plurality of devices installed in the production system S is classified to Item 11. The environment information acquisition means 2 acquires environment information belonging to Item 11 using a signal transmitted from respective devices, for example. Information on a supply voltage of the camera 6 is classified to Item 12. The environment information acquisition means 2 acquires environment information belonging to Item 12 using an output of a voltage sensor, for example. Information on alarms output from respective devices is classified to Item 13. The environment information acquisition means 2 acquires environment information belonging to Item 13 using alarm signals transmitted from respective devices, for example.

The environment information acquired by the environment information acquisition means 2 includes non-numerical information such as weather information of Item 6 and information on the ON/OFF state of the ceiling light of Item 7, for example. The environment information acquisition means 2 preferably numericalize such non-numerical information according to predetermined rules and transmit the same to the information processing device 3. Specifically, as for the weather information, for example, "0" may be allocated to "sunny" and "1" may be allocated to "cloudy." Moreover, as for the information on the ON/OFF state of the ceiling light, "1" may be allocated to "ON" and "0" may be allocated to "OFF."

A change in the environment information acquired using the environment information acquisition means 2 is gentler than a change in the image signal transmitted from the camera 6 or the image processing information, the operation result information, and the like transmitted from the controller 7. Therefore, the environment information acquisition means 2 preferably acquire the environment information at a longer interval than the interval of the controller 7 generating the image processing information or the operation result information and transmit the environment information to the information processing device 3.

The information processing device 3 is configured as a computer including a storage device 31 that stores various pieces of data, programs, and the like, an arithmetic unit 32 that executes operations related to estimation of abnormalities in the camera 6 and the cause thereof using the data stored in the storage device 31, and a display unit 33 that displays an operation result obtained by the arithmetic unit 32 in a form that can be visually perceived by an operator.

Pieces of time-series data of the image signal transmitted from the camera 6, the image processing information transmitted from the image processing unit 71, the operation result information transmitted from the robot control unit 72, and the environment information transmitted from the environment information acquisition means 2 are stored in the storage device 31. Moreover, information on change over time in the image processing information and the operation result information, and the environment information is also stored in the storage device 31. Here, the change over time is a difference value between a value at each time point of target information and a value at a time point before a predetermined period.

Figure 2:
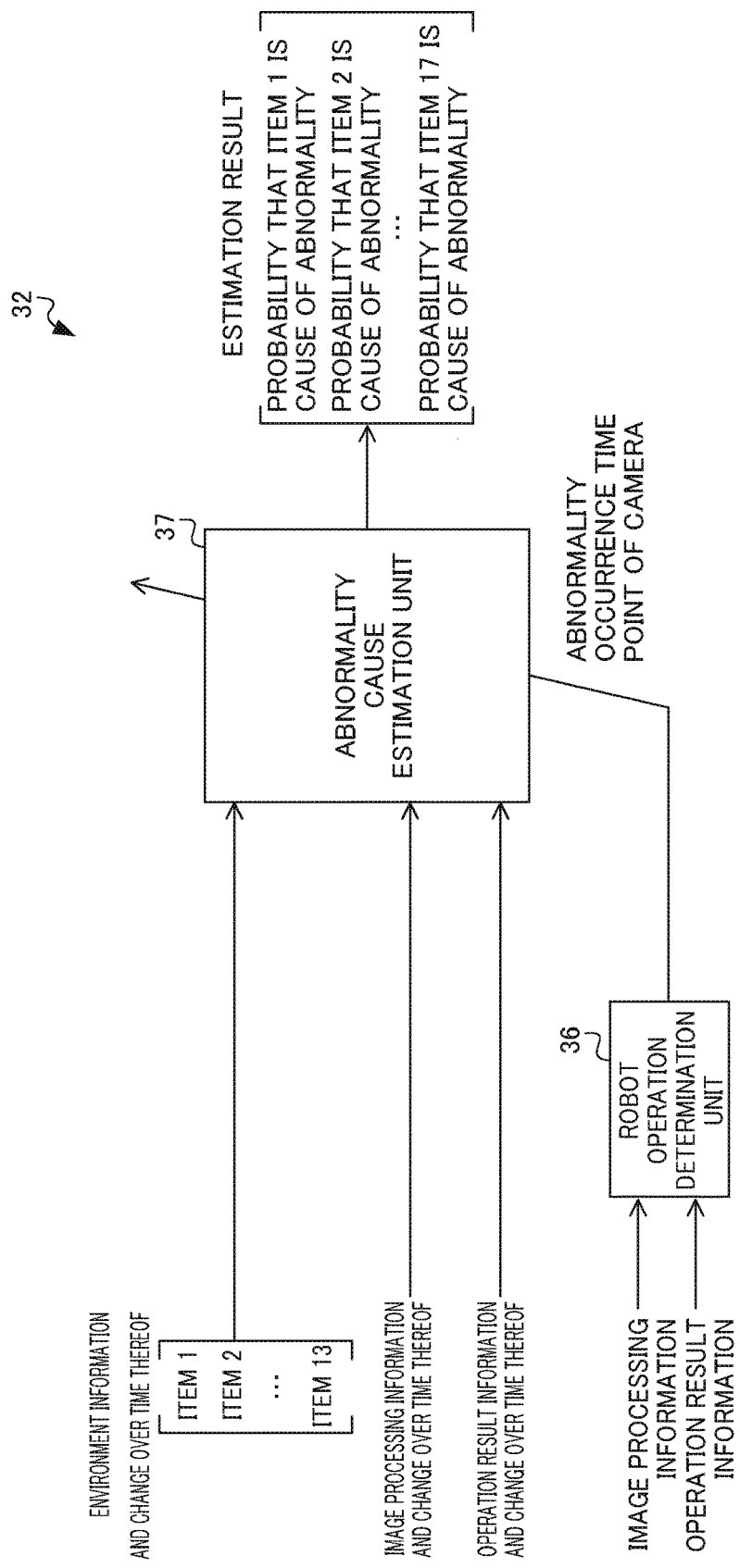
FIG. 2 is a diagram illustrating a specific procedure of operations related to estimation of the cause of abnormalities in a camera.

FIG. 2 is a functional block diagram illustrating a functional configuration of the arithmetic unit 32. The arithmetic unit 32 includes a robot operation determination unit 36 and an abnormality cause estimation unit 37 and estimates the cause of abnormalities in the camera 6 using these units. Hereinafter, the functions of the respective modules 36 and 37 configured to be realized by operations of the arithmetic unit 32 will be described sequentially.

The robot operation determination unit 36 determines whether the robot 5 can realize an appropriate function using the operation result information among the pieces of data stored in the storage device 31. More specifically, the robot operation determination unit 36 determines whether a conveying operation executed by the robot 5 is appropriate on the basis of the image signal transmitted from the camera 6. As described above, the operation result information includes information on success or failure in a series of conveying operations executed by the robot 5 on the basis of the image signal of the camera 6. More specifically, the operation result information includes information on whether the robot 5 is able to grasp the workpiece W and information on a grasping shift amount. Therefore, the robot operation determination unit 36 determines that the conveying operation of the robot is appropriate when the robot 5 is able to grasp the workpiece W and the grasping shift amount is equal to or larger than a predetermined reference value. Moreover, the robot operation determination unit 36 determines that the conveying operation of the robot is not appropriate when the robot 5 is unable to grasp the workpiece W or the grasping shift amount is larger than the reference value.

When it is determined that the conveying operation of the robot is not appropriate, the robot operation determination unit 36 specifies the image processing information used as the input to the robot control unit 72 at the time of executing the inappropriate conveying operation from the past image processing information stored in the storage device 31 and transmits the acquisition time point of the image signal used for the image processing unit 71 to generate the image processing information to the abnormality cause estimation unit 37 as an abnormality occurrence time point of the camera 6.

Although FIG. 2 illustrates a case in which the abnormality occurrence time point of the camera 6 is specified from the result of the conveying operation of the robot by the robot operation determination unit 36, the means for specifying the abnormality occurrence time point of the camera 6 is not limited to this. The abnormality occurrence time point of the camera 6 may be manually set by an operator and be input to the abnormality cause estimation unit 37. When a certain abnormality occurs in the camera 6 and the image signal transmitted from the camera 6 is abnormal, the occurrence of an abnormality in the camera 6 and the abnormality occurrence time point may be specified by the image processing unit 71 performing an image processing operation on the image signal from the camera 6. Therefore, the abnormality occurrence time point of the camera 6 may be specified by the image processing unit 71 on the basis of the image signal transmitted from the camera 6.

In this way, the abnormality cause estimation unit 37 estimates the cause of an abnormality in the camera 6 using the abnormality occurrence time point of the camera 6 specified by the robot operation determination unit 36, the image processing unit 71, or the like, the environment information within the data stored in the storage device 31 and information on the change with time thereof, the image processing information and the information on the change with time thereof, and the image signal as a group of pieces of input data and displays the estimation result on the display unit 4.

In the abnormality cause estimation unit 37, possible causes of abnormalities in the camera 6 are defined as and classified into a plurality of (for example, seventeen) abnormality cause items. These seventeen abnormality cause items can be grouped into Items 1 to 13 belonging to an environmental cause group in which the cause of abnormalities in the camera 6 originates from an environment and the other causes, that is Items 14 to 17 belonging to an internal cause group in which the cause of abnormalities in the camera 6 originates from a failure in the camera 6 or a device (a cable, an image processing unit, and the like) connected to the camera 6. Moreover, the thirteen environmental items defined to subdivide the environment information is used as Items 1 to 13 belonging to the environmental cause group. That is, the abnormality cause items 1 to 13 are the same as environmental items 1 to 13 described above, respectively. A failure in the camera 6 (more specifically, a failure due to a cloudiness or a dirt on a lens, for example) is classified to Item 14 belonging to the internal cause group. A failure in the image processing unit 71 is classified to Item 15. A failure in the cable connecting the camera 6 and the image processing unit 71 (more specifically, a failure due to disconnection of a cable or noise associated with the cable) is classified to Item 16. A failure in the robot 5 (more specifically, a failure due to a decrease in positioning accuracy of the robot 5 or a synchronization error between the robot 5 and the camera 6) is classified to Item 17.

The abnormality cause estimation unit 37 calculates the strength of correlation between an abnormality in the camera 6 estimated to have occurred at an abnormality occurrence time point and predetermined respective abnormality cause items (more specifically, the percentage indicating the probability that the respective abnormality cause items are the causes of abnormalities in the camera 6) using the input data group input earlier than the abnormality occurrence time point.

Since the input data group includes information on the environment of the camera 6 correlated with the function of the camera 6, the input data group and the abnormality in the camera 6 have a correlation. For example, when an abnormality occurs in the camera 6 due to excessive vibration of the camera 6 due to a certain reason, there is a strong correlation between the occurrence of the abnormality in the camera 6 and a change in the information on the vibration of the camera 6 belonging to Item 1 of the environment information. Moreover, for example, when an abnormality occurs in the camera 6 due to a rise in the temperature of the peripheral device of the camera 6, there is a strong correlation between the occurrence of the abnormality in the camera 6 and a change in the temperature of the peripheral device belonging to Item 3 of the environment information. Furthermore, for example, when an abnormality occurs in the camera 6 clue to a strong glow of evening sun entering the light receiving surface of the camera 6, there is a strong correlation between the occurrence of the abnormality in the camera 6 and information on the date and the time belonging to Item 5 of the environment information. The abnormality cause estimation unit 37 learns a correlation among such environment information, environmental change information, the image processing information, and the abnormalities in the camera 6 using an existing machine learning algorithm to thereby calculate the probability that the respective abnormality cause items are the causes of the abnormalities in the camera 6.

A specific example of the machine learning algorithm used in the abnormality cause estimation unit 37 includes a layered multi-input-multi-output-type neural network which includes an input layer, an intermediate layer, and an output layer, each layer being formed by coupling a plurality of neurons having predetermined input-output characteristics, for example. More specifically, when an input data group made up of an abnormality occurrence time point of the camera 6, a plurality of pieces of environment information in a predetermined period between the abnormality occurrence time point and a predetermined previous time point and information on the change with time thereof, a plurality of pieces of image processing information in the predetermined period and information on the change with time thereof, and a plurality of image signals in the predetermined period is input to each neuron that forms the input layer, the abnormality cause estimation unit 37 outputs the probability that the respective abnormality cause items are the causes of the abnormality in the camera 6.

Figure 3:
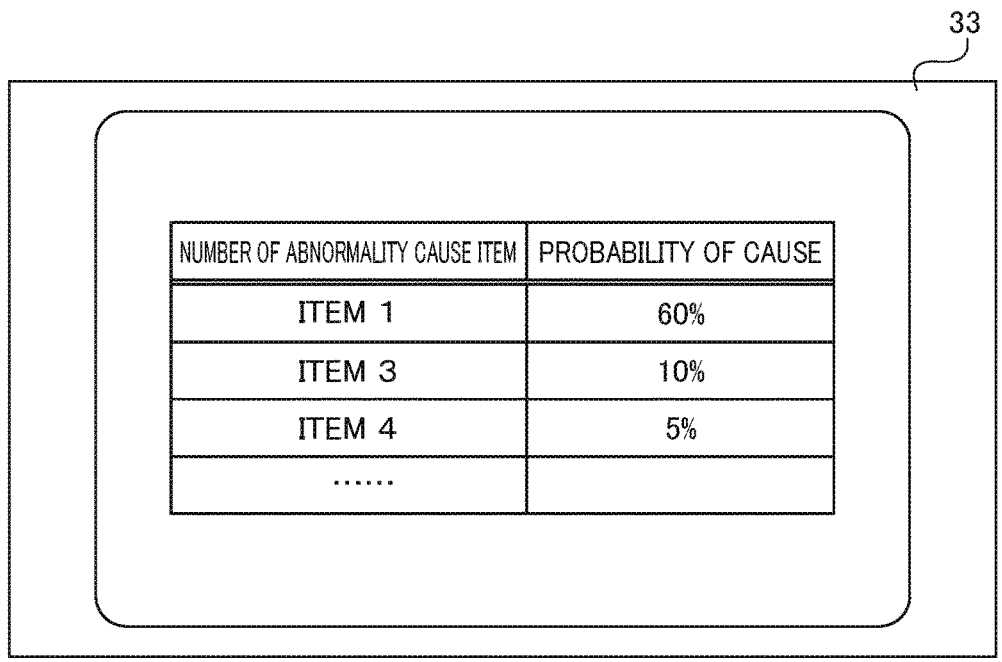
FIG. 3 is a diagram illustrating an example of an estimation result of an abnormality cause estimation unit, displayed on a display unit.

FIG. 3 is a diagram, illustrating an example of an estimation result obtained by the abnormality cause estimation unit 37 displayed on a monitor of the display unit 4. As illustrated in FIG. 3, the abnormality cause estimation unit 37 calculates the probabilities that the respective abnormality cause items are the causes of abnormalities in the camera 6 using the above-described machine learning algorithm and displays the numbers of abnormality cause items and the probabilities on the display unit 4 in descending order of probabilities. By doing so, since an operator can ascertain the causes of abnormalities in descending order of abnormality cause items displayed on the display unit 4 (in the example of FIG. 3, in the order of Items 1, 3, and 4), it is possible to specify the cause of the abnormality in the camera 6 more quickly than the conventional method in which a presumed cause is checked by a round-robin method.

Second Embodiment

Next, a second embodiment of the present invention will be described with reference to the drawings. An abnormality cause estimation system 1A according to the present embodiment is different from the abnormality cause estimation system 1 of the first embodiment in that the means for specifying the abnormality occurrence time point of the camera 6 is different from that of the first embodiment.

Figure 4:
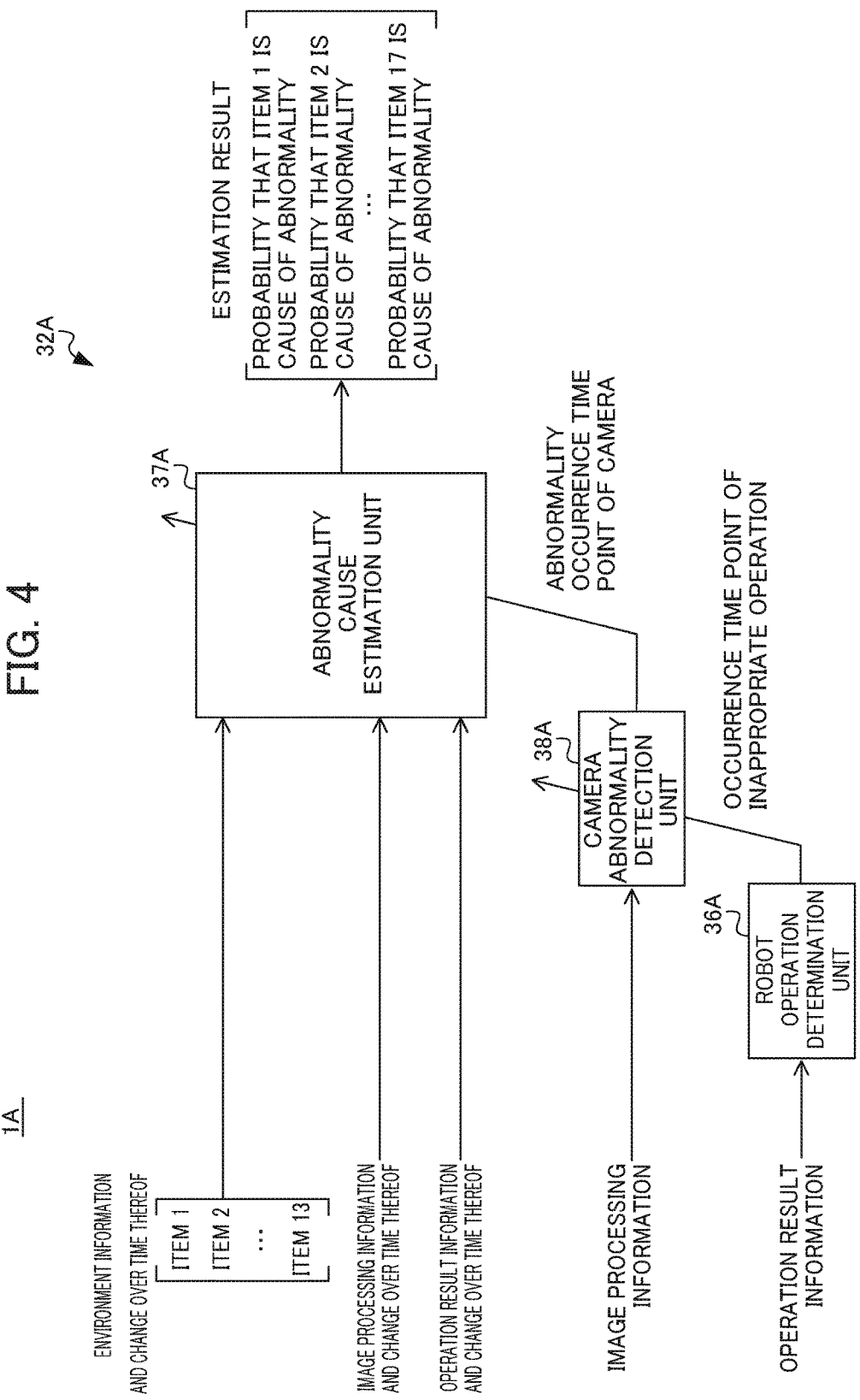
FIG. 4 is a diagram illustrating a specific procedure of operations related to estimation of the cause of abnormalities in a camera in an abnormality cause estimation system according to a second embodiment of the present invention.

FIG. 4 is a functional block diagram illustrating a functional configuration of an arithmetic unit 32A of the abnormality cause estimation system 1A according to the present embodiment. The arithmetic unit 32A includes a robot operation determination unit 36A, an abnormality cause estimation unit 37A, and a camera abnormality detection unit 38A and estimates the cause of abnormalities in the camera 6 using these elements. Hereinafter, the functions of the respective modules 36A to 38A configured to be realized by operations of the arithmetic unit 32A will be described sequentially.

The robot operation determination unit 36A determines whether the robot 5 can realize an appropriate function using the operation result information among the pieces of data stored in the storage device 31. More specifically, the robot operation determination unit 36 determines whether a conveying operation executed by the robot 5 is appropriate on the basis of the image signal transmitted from the camera 6. When it is determined that the conveying operation of the robot is not appropriate, the robot operation determination unit 36A transmits information on a time point at which the inappropriate operation was executed to the camera abnormality detection unit 38A. A specific procedure of the robot operation determination unit 36A determining whether the conveying operation of the robot is appropriate or not is the same as that of the robot operation determination unit 36 of the first, and the detailed description thereof will be omitted.

The camera abnormality detection unit 38A detects an abnormality in the camera 6 using the determination result obtained by the robot operation determination unit 36A and the image processing information within the data stored in the storage device 31. More specifically, when the robot operation determination unit 36A determines that the conveying operation of the robot is not appropriate, the camera abnormality detection unit 38A determines whether the cause of the inappropriate conveying operation results from an abnormality in the camera 6 using the image processing information obtained earlier than the execution time point of the inappropriate conveying operation and transmits the abnormality occurrence time point of the camera 6 to the abnormality cause estimation unit 37A.

As described above, since the image processing information includes information used directly for the robot control unit 72 to control the robot 5, there is a correlation between the image processing information and the abnormality in the conveying operation of the robot 5. More specifically, for example, when the contrast of an outline of the workpiece W included in the image processing information has decreased excessively or the image has been brightened excessively, the robot control unit 72 may be unable to realize an appropriate conveying operation. The camera abnormality detection unit 38A learns a correlation between such image processing information and the abnormality in the conveying operation of the robot 5 using an existing machine learning algorithm to detect an abnormality in the camera 6 using the image processing information.

A specific example of the machine learning algorithm used in the camera abnormality detection unit 38A includes a layered multi-input-single-output-type neural network which includes an input layer, an intermediate layer, and an output layer, each layer being formed by coupling a plurality of neurons having predetermined input-output characteristics, for example. More specifically, when an input data group made up of an output (the execution time point of the inappropriate conveying operation) of the robot operation determination unit 36 and a plurality of pieces of image processing information obtained in a period between the execution time point of the inappropriate conveying operation and a predetermined previous time point is input to each neuron that forms the input layer, the camera abnormality detection unit 38A outputs the abnormality occurrence time point of the camera 6 to the neuron of the output layer.

When the abnormality in the camera 6 is detected by the camera abnormality detection unit 38A, the abnormality cause estimation unit 37A estimates the cause of the abnormality in the camera 6 using the abnormality occurrence time point specified by the camera abnormality detection unit 38A, the environment information within the data stored in the storage device 31 and information on the change over time thereof, the operation result information and information on the change over time thereof, and the image signals as an input data group and displays an estimation result on the display unit 4. A specific procedure of the abnormality cause estimation unit 37A estimating the cause of the abnormality in the camera 6 using the input data group is the same as that of the abnormality cause estimation unit 37 of the first embodiment, and the detailed description thereof will be omitted.

While an embodiment of the present invention has been described, the present invention is not limited thereto.

EXPLANATION OF REFERENCE NUMERALS

S: Production system.
1, 1A: Abnormality cause estimation system
2: Environment information acquisition means
3: Information processing device
31: Storage device
32, 32A: Arithmetic unit
33: Display unit (Display means)
36, 36A: Robot operation determination unit (Abnormality occurrence time point specifying means)
37, 37A: Abnormality cause estimation unit (Abnormality cause estimation means)
38A: Camera abnormality detection unit (Abnormality occurrence time point specifying means)
5: Robot (Production device)
6: Camera (Visual sensor)
7: Controller
71: Image processing unit (Image processing means, Abnormality-occurrence time point specifying means)
72: Robot control unit

What is claimed is:

1. A visual sensor abnormality cause estimation system for estimating causes of abnormalities in a visual sensor in a production system including a production device and a controller, the visual sensor being a sensor that detects visual information on the production device or of a surrounding thereof, and the controller being a controller that controls the production device based on the visual information obtained by the visual sensor, the visual sensor abnormality cause estimation system comprising:
   a storage device having stored therein information comprising: time-series pieces of the visual information from the visual sensor; and a plurality of predetermined abnormality cause items, including at least one visual sensor equipment cause item and at least one environmental cause item;
   at least one environment sensor;
   an environment information acquisition means for acquiring, via the at least one environment sensor, time-series environment information of an environment of the visual sensor at a timing according to a predetermined time interval, the time-series environment information including time-series values of one or more types of environmental items, respectively, and storing the time-series environment information of the one or more types of environmental items in the storage device as the at least one environmental cause item, respectively;
   an operation determination unit that determines an abnormality of the production device based on the time-series pieces of the visual information from the visual sensor, and that determines an abnormality occurrence time point associated with the abnormality, and that stores the abnormality time point in the storage device; and
   an abnormality cause estimation means for estimating a strength of correlation between the abnormality and each of the plurality of predetermined abnormality cause items based on the time-series environment information at the abnormality time point, and for displaying the estimated strength of correlation on a display for the respective abnormality cause items.

2. The visual sensor abnormality cause estimation system according to claim 1, wherein
   the time associated with the abnormality is an occurrence time point of the abnormality in the visual sensor; and
   the abnormality cause estimation means estimates the strength of correlation using the environment information in a period between the abnormality occurrence time point and a predetermined previous time point.

3. The visual sensor abnormality cause estimation system according to claim 2, further comprising:
   an abnormality occurrence time point specifying means for specifying the abnormality occurrence time point based on the visual information.

4. The visual sensor abnormality cause estimation system according to claim 2, further comprising:
   an image processing means for performing a predetermined image processing operation on the visual information; and
   an abnormality occurrence time point specifying means for specifying the abnormality occurrence time point using image processing information obtained through the image processing operation and operation result information on a result of operations performed by the production device on the basis of the visual information.

5. The visual sensor abnormality cause estimation system according to claim 1, wherein
   the environment information includes values of plural types of environmental items, and
   each of the environmental items corresponds to a respective one of the plurality of predetermined abnormality cause items.

6. The visual sensor abnormality cause estimation system according to claim 5, wherein
   the plural types of environmental items include vibration of a specific device installed around the visual sensor, a temperature of the specific device, and a brightness of the surrounding of the visual sensor.

7. The visual sensor abnormality cause estimation system according to claim 1, wherein
   the abnormality cause estimation means estimates the strength of correlation between an abnormality in the visual sensor and each of the plurality of abnormality cause items using the environment information and information on the change over time thereof as an input.

\* \* \* \* \*